United States Patent [19]

Zielinski

[11] Patent Number: 4,739,357

[45] Date of Patent: Apr. 19, 1988

[54] MULTI-PITCH FILM LEADER CARD

[75] Inventor: Erich Zielinski, Bergen, N.Y.

[73] Assignee: Eastman Kodak Company, Rochester, N.Y.

[21] Appl. No.: 74,176

[22] Filed: Jul. 16, 1987

[51] Int. Cl.[4] ........................... G03D 3/13; G03B 1/56

[52] U.S. Cl. ..................................... 354/321; 352/235; 226/92; 226/170

[58] Field of Search ................ 354/321, 322; 352/235, 352/241; 226/92, 170

[56] References Cited

U.S. PATENT DOCUMENTS

| | | | |
|---|---|---|---|
| 1,561,941 | 6/1925 | Merle | 352/235 |
| 3,499,706 | 12/1965 | Hanson et al. | 352/235 |
| 4,047,615 | 9/1977 | Jansen | 226/170 |
| 4,222,657 | 9/1980 | Leuchter | 354/321 |
| 4,295,713 | 10/1981 | Edwards | 352/235 |
| 4,613,221 | 9/1986 | Takase et al. | 354/321 |

*Primary Examiner*—A. A. Mathews

*Attorney, Agent, or Firm*—Roger A. Fields

[57] ABSTRACT

A film leader card has a series of holes for receiving the projections on a succession of endless timing belts in a film processor to advance the card and an attached filmstrip through the processor. A middle-most hole in the series of holes is spaced relative to an adjacent hole in the series to match the pitch of the projections. Each of the holes in the series forward of the middle-most hole has a pitch slightly greater than the pitch of the projections. Each of the holes in the series rearward of the middle-most hole has a pitch slightly less than the pitch of the projections. Consequently, the leader card is projection-driven only at its middle-most hole since the projections received in the forward and rearward holes are substantially clear of any contact with the edges of those holes. This clearance between the forward and rearward holes and the projections facilitates transfer of the leader card from one timing belt to another timing belt in the film processor.

7 Claims, 4 Drawing Sheets

MULTI-PITCH FILM LEADER CARD

CROSS-REFERENCE TO A RELATED APPLICATION

Reference is made to commonly assigned, copending patent application Ser. No. 064,421, entitled Liquid Distribution Box and filed June 22, 1987 in the name of Peter G. Stromberg.

BACKGROUND OF THE INVENTION

1. Field of the Invention

This invention relates generally to photographic film processing apparatus. More particularly, the invention relates to a film leader card for use in a film processor to transport a filmstrip attached to the card through one or more film processing baths.

2. Description of the Prior Art

The processing of photographic film involves a sequence of solution-treating steps such as developing, bleaching, fixing, and rinsing. These steps lend themselves to mechanization by conveying long strips of film sequentially through a series of adjacent stations or tanks, each one containing a processing solution appropriate to the process step at that station.

One type of known film processor employs a film leader card which is advanced to pull one or more filmstrips attached to the card along respective processing racks in successive processing tanks or stations in the processor. The leader card is advanced through the film processor by respective endless timing belts moving around the successive racks, and is guided by a crossover member from one rack to the next one. The leader card has a series of holes for engagement with respective projections on each timing belt. Typically, the holes in the leader card are evenly spaced and identical in size to match the pitch of the projections on the timing belts.

U.S. Pat. No. 4,613,221, issued Sept. 23, 1986 to Takase et al, discloses a film processor of the type having a succession of endless timing belts with evenly spaced projections for engaging a leader card to advance a filmstrip attached to the card through the processor. The Takase patent shows a leader card having a plurality of evenly spaced holes for engagement with the respective projections on each timing belt. The holes and the projections have the same pitch. A potential problem associated with the leader card, due to the match in the pitch of the holes and the projections, involves the possibility of interference between the card and the projections during transfer of the card from one timing belt to another timing belt. Specifically, one way in which this problem manifests itself is that a leading area of the leader card, when trying to first engage the next timing belt, may "stub" on a projection on that belt and thus not engage properly with the belt. See FIG. 2 in the accompanying drawings. The other side of the problem is that a trailing area of the leader card, when trying to disengage from the last timing belt, may "hang up" on a projection on that belt and thus not be able to disengage from the belt. See FIG. 3 in the accompanying drawings. Further detail as to these problems is provided below.

SUMMARY OF THE INVENTION

According to the invention there is provided an improved film leader card of the type wherein said card has a series of holes adapted to receive respective projections on a timing belt within a film processor a transport a filmstrip attached to the card in the processor, each of the projections having the same pitch, and wherein the improvement comprises:

a forward group of the holes in said series being located closer to a leading area on said card than a trailing area on the card, and each of those holes having an identical pitch which is slightly greater than the pitch of the projections;

a rearward group of the holes in said series being located closer to the trailing area on said card than the leading area on the card, and each of those holes having an identical pitch which is slightly less than the pitch of the projections; and at least one of the holes in said series being located between said forward and rearward groups of holes, and having a pitch relative to an adjacent hole in the series which is the same as the pitch of the projections.

With the invention, interference (as in the prior art) between the leader card and the projections on two successive timing belts, either in the form of "stubbing" or "hang up" during transfer of the card from one belt to another belt, is avoided. This is achieved by the novel pitch arrangement of the holes in the leader card.

DESCRIPTION OF THE PREFERRED EMBODIMENT

Figure 1:
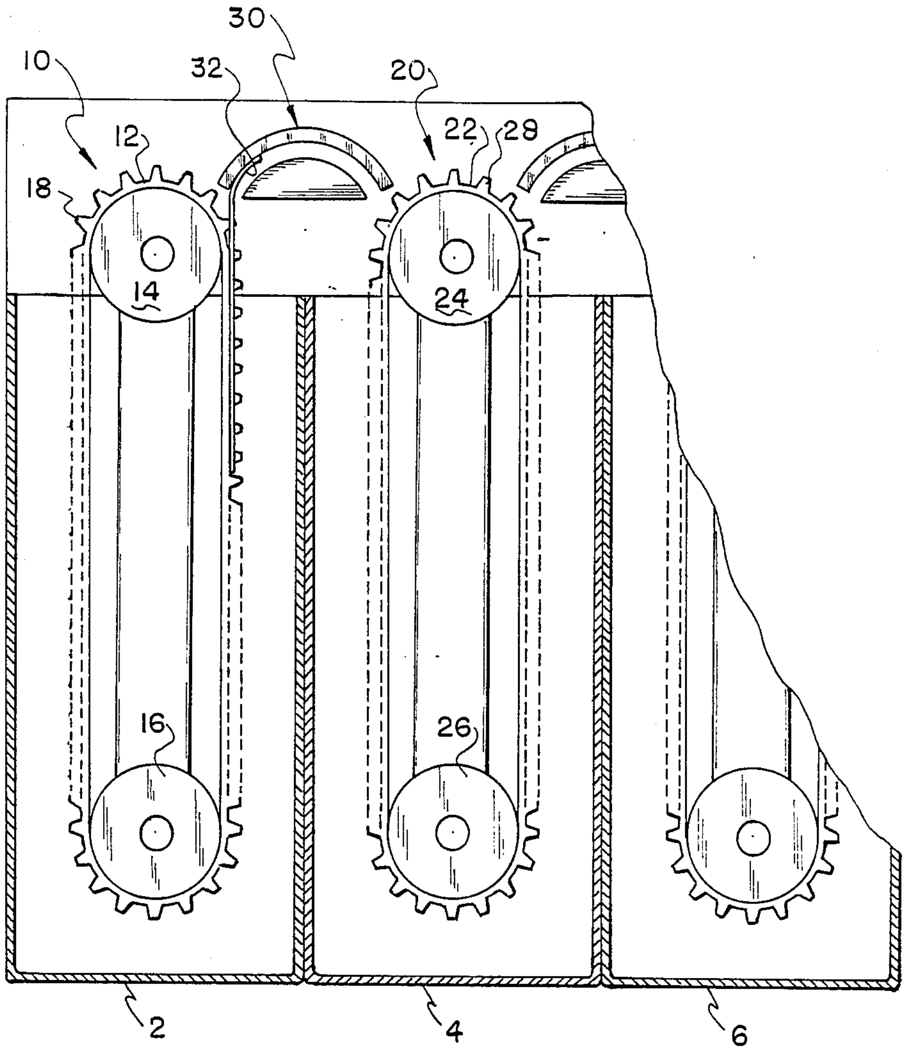
FIG. 1 is a schematic side elevation view of first and second film processing racks immersed in respective processing tanks and joined by a cross-over member, with a film leader card being moved along the first rack by an endless timing belt.

Referring to FIG. 1, a film processor is shown which is similar in many respects to the one disclosed in the commonly assigned, copending patent application cross-referenced above. The processor includes a succession of adjacent film processing tanks 2, 4, 6 etc. Each of the tanks 2, 4, and 6 is intended to contain a different film processing solution, such as developer, fix and bleach solutions. A first film processing rack 10 is positioned upright in the first processing tank 2; a second film processing rack 20 is positioned upright in the second processing tank 4, etc. The first processing rack 10 includes an endless timing belt 12 which extends over an upper drive sprocket 14 and under a lower idler sprocket 16, in positive engagement with the two sprockets for synchronous movement with them. The endless timing belt 12 has outer projections or teeth 18 evenly spaced along its periphery. Each of the projections 18 are the same size and have the same pitch. The second processing rack 20 includes an endless timing belt 22 which extends over a drive sprocket 24 and under an idler sprocket 26, in positive engagement with the two sprockets for synchronous movement with them. The endless timing belt 22 has outer projections or teeth 28 evenly spaced along its periphery. The projections 28 match the projections 18 (on the first timing belt 12) in size and pitch. A concave top cross-over member 30 is mounted between a rear half of the first processing rack 10 and a front half of the second processing rack 20. The cross-over member 30 forms a 180 degree or U-turn of a film process path along which an exposed filmstrip is to be transported from the first processing tank 2 to the next one.

A prior art rectangular-shaped film leader card 32 comprises a thin, flexible, synthetic resin sheet having a longitudinal series of square holes 34 evenly spaced along its length. See FIG. 2. Each of the holes 34 has the same pitch as the projections 18 and 28 on the first and second timing belts 12 and 22. Two parallel filmstrips 54 may be secured to the leader card 32 by a suitable adhesive or other bonding means 56. See FIG. 5. Other details of the leader card 32 are disclosed in U.S. Pat. No. 4,613,221, more fully referenced above.

In operation, the prior art leader card 32 with the attached two filmstrips 54 is introduced to the first processing rack 10. The holes 34 in the leader card are engaged by the respective projections 18 on the first timing belt 12, which thus drives the leader card and the attached filmstrips 54 along the first processing rack 10. The leader card 32 and the attached filmstrips 54 are advanced from the first processing rack 10, through the top cross-over member 30, and to the second processing rack 20. At the second processing rack 20, the leader card 32 is engaged by the respective projections 28 on the second timing belt 22, which thus drives the leader card and the attached filmstrips 54 along the second processing rack 20.

Figure 2:
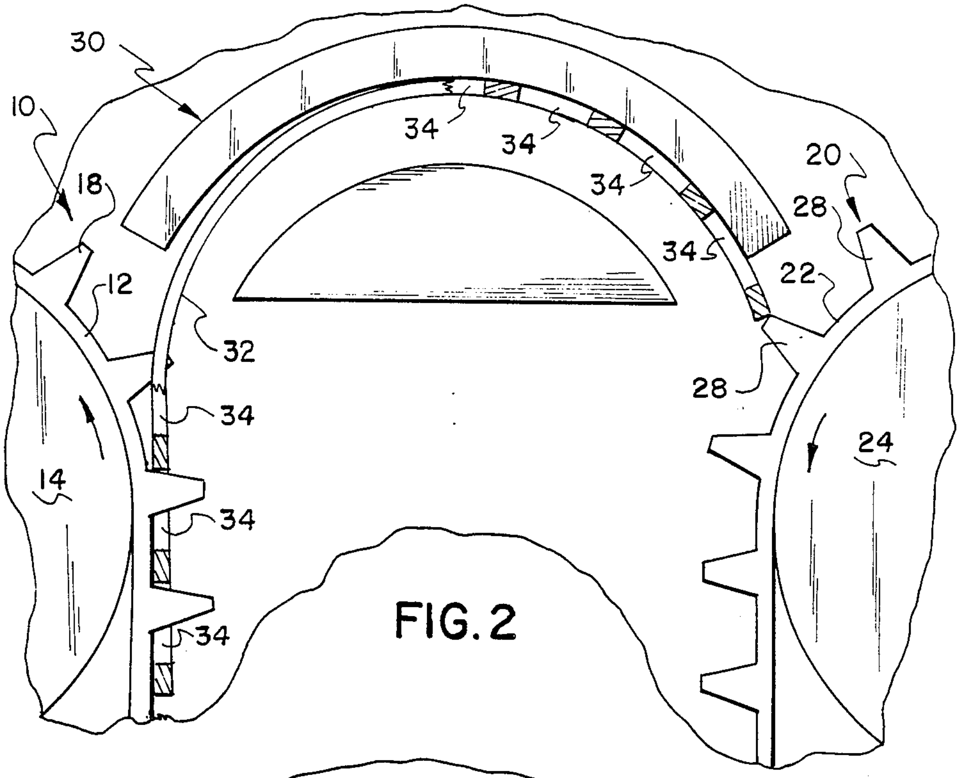
FIG. 2 is an enlarged schematic detail from FIG. 1, illustrating a potential problem with a prior art leader card engaging one timing belt and "stubbing" another timing belt.

FIG. 2 shows the prior art leader card 32 moving through the top cross-over member 30, prior to disengaging from the first timing belt 12, and before initially engaging the second timing belt 22. The match between the pitch of the respective projections 18 and 28 on the first and second timing belts 12 and 22 and the pitch of the holes 34 in the leader card 32 means that a leading (forward) edge of each hole in the leader card will make contact with each projection on a timing belt. This requires a close spatial synchronization of the timing belts 12 and 22, to make a smooth transfer of the leader card 32 from the first belt 12 to the next one 22. Although the first and second belts 12 and 22 are locked into temporal synchronization (by means not shown), their spatial synchronization is not assured and may be affected by belt stress or belt war. If the timing belts are not spatially synchronized, the leading (forward) area of the leader card 32, when trying to initially engage the second belt 22, may "stub" on one of the projections 28 on that belt, as illustrated in FIG. 2.

Figure 3:
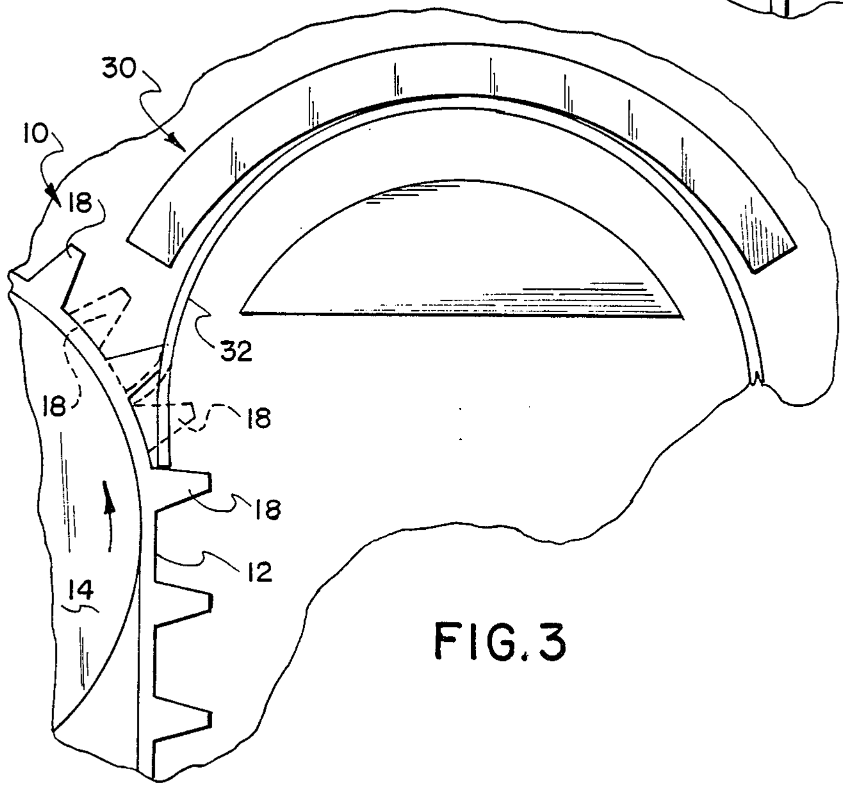
FIG. 3 is an enlarged schematic detail from FIG. 1, illustrating a potential problem with the prior art leader card "hanging up" on the first timing belt.

FIG. 3 (as compared to FIG. 2) shows later movement of the prior art leader card 32 from the first timing belt 12 to the second timing belt 22. In FIG. 3, the leader card is completing its disengagement from the first timing belt 12. If the timing belts are not spatially synchronized, the trailing (rearward) area of the leader card 32, when trying to separate from the first timing belt 12, may "hang up" on one of the projections 18 on that belt, as illustrated in FIG. 3.

Figure 4:
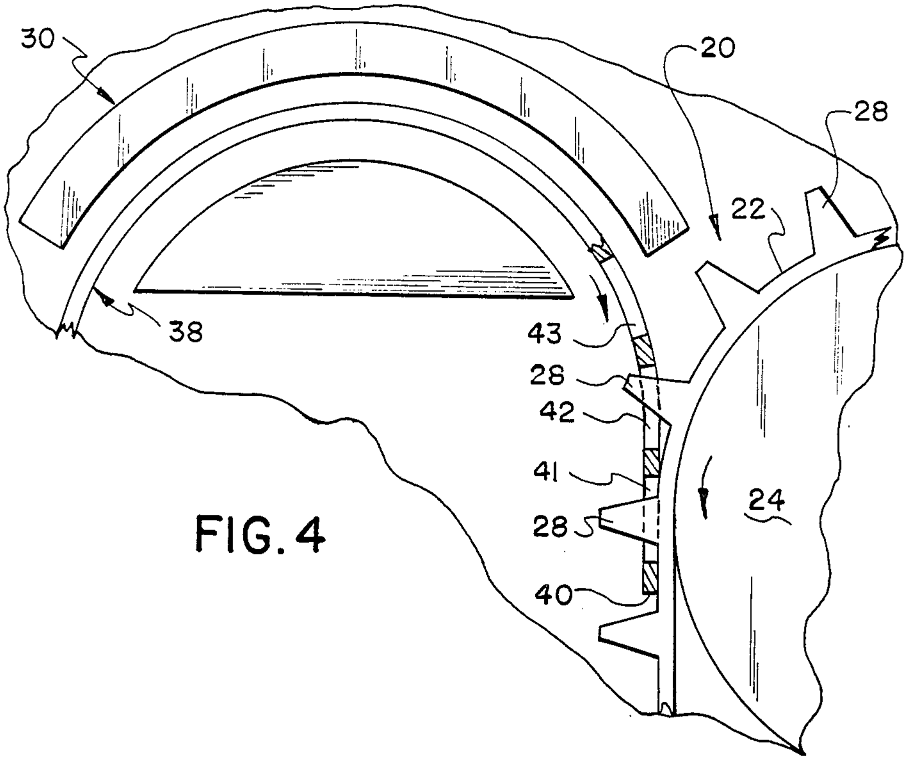
FIGS. 4 and 4*a* are enlarged schematic details similar to FIGS. 2 and 3, respectively, illustrating the results achieved using an improved film leader card according to a preferred embodiment of the invention.
Figure 4A:
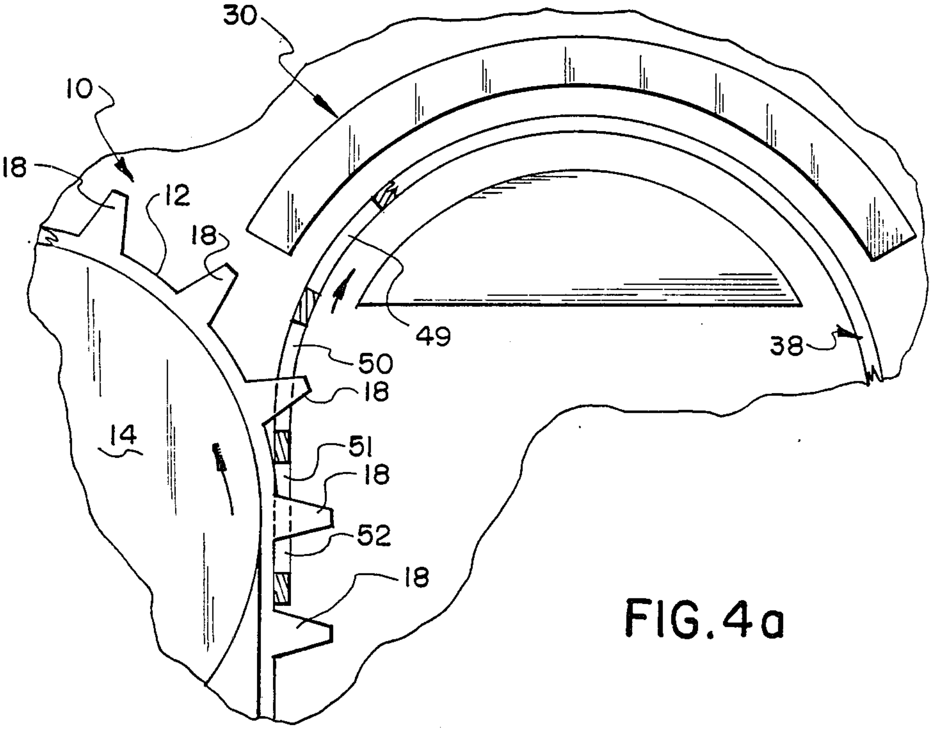

FIG. 4 shows the operation of another film leader card 38 which, according to a preferred embodiment of the invention, is improved over the prior art leader card 32. Specifically, FIG. 4 shows the respective positions of the leading (forward) area 40 of the leader card 38 and a first hole 41 in the card, when one of the projections 28 on the second timing belt 22 is received in the first hole. Note there is no contact between that projection and any edge of the first hole, that is, the projection is positioned substantially in the center of the hole. FIG. 4*a* shows the respective positions of the trailing (rearward) area 52 of the leader card 38 and a last hole 51 in the card, when one of the projections 8 on the first timing belt 12 is received in the last hole. Note there is no contact between that projection and any edge of the last hole, that is, the projection is positioned substantially in the center of the hole. Thus, as can be appreciated from FIGS. 4 and 4*a*, transfer of the leader card 38 from the first belt 12 to the second belt 22 is made easier.

Figure 5:
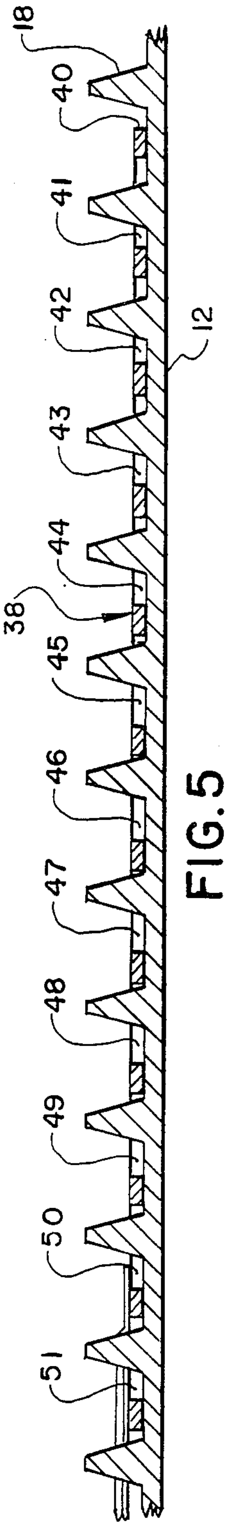
FIG. 5 is a top plan view of the improved film leader card.

FIG. 5 is a front view of the improved leader card 38. As shown, the leader card 38 is a substantially rectangular thin flexible synthetic resin sheet having a longitudinal series of square similar size holes 41–51 spaced along its length between its leading area 40 and its trailing area 52. Specifically, the series of holes comprise the first hole 41, a second hole 42, a third hole 43, a fourth hole 44, a fifth hole 45, a sixth or middle-most (central) hole 46, a seventh hole 47, an eighth hole 48, a ninth hole 49, a tenth hole 50, and an eleventh or last hole 51. The eleven holes 41–51 have forward edges 41*a*–51*a*, respectively. The forward edge 46*a* of the middle-most hole 46 and the forward edge 47*a* of the adjacent seventh hole 47 are spaced by a central pitch "x", exactly equal to the pitch of the respective projections 18 and 22 on the first and second timing belts 12 and 22. Conversely, the respective forward edges 41*a*–51*a* of the first five holes 41–45 are spaced by identical pitches 41*a*–42*a*, 42*a*–43*a*, 43*a*–44*a*, 44*a*–45*a*, and 45*a*–46*a*, slightly greater than the pitch "x" of the projections on the timing belts by an amount "Δx" (i.e., the pitch of these edges is "x"+"Δx"). The respective forward edges 47*a*–51*a* of the last five holes 47–51 are spaced by identical pitches 47*a*–48*a*, 48*a*–49*a*, 49*a*–50*a*, 50*a*–51*a*, and 51*a*–52, slightly smaller than the pitch "x" of the projections on the timing belts by an amount of "αx" (i.e., the pitch of these edges is "x"−"Δx"). See FIG. 5.

Figure 6:
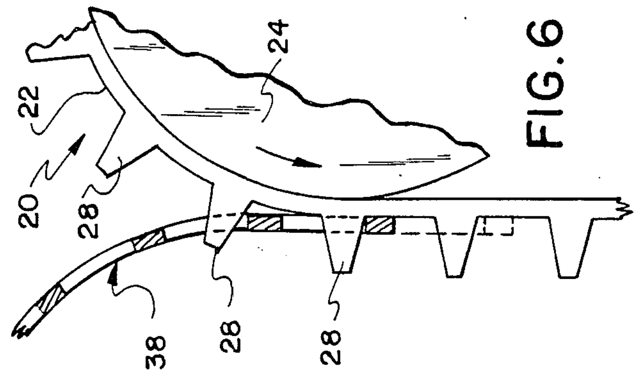
FIG. 6 is a side edge view of the improved leader card, shown in full association with a timing belt.

With the pitch configuration "x"+"Δx" or "x"−"Δx", when the improved leader card 38 is engaged with either of the timing belts, such as the first belt 12 shown in FIG. 6, the projections on the belt are in driving contact only with the forward edges 46*a* and 47*a* of the sixth and seventh holes 46 and 47, respectively. Moreover, the projections on the timing belt are increasingly positioned nearer the center of the other holes 41–45 and 48–51, with each successive hole forward or rearward of the middle-most hole 46. Thus, the respective projections on the timing belt in the first hole 41 and in the last hole 51 are clear of any frictional or interfering contact with the leader card 38 (as compared to the prior art leader card 32).

Figure 7:
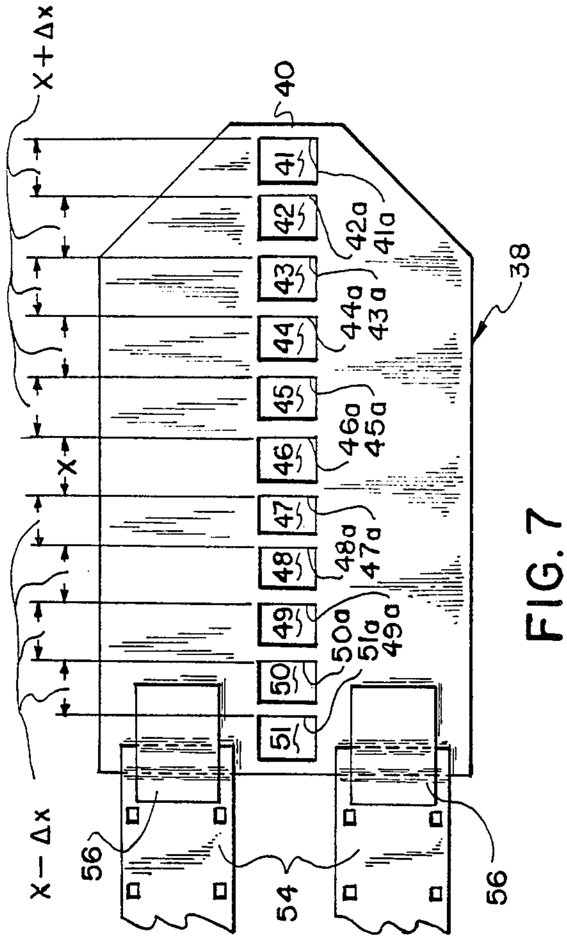
FIG. 7 is an enlarged schematic detail illustrating the coaction of the improved leader card and the timing belt during initial association.

FIG. 7 shows how the condition of FIG. 6 is achieved, and is somewhat similar to FIG. 4. As the leader card 38 is introduced to a processing rack, such as the second one 20, and moves into initial association with the second timing belt 22, one of the projections 28 on the belt will enter the first hole 41 in the card. Then, as more of the leader card 38 is advanced to the second rack 20, other projections 28 will enter the successive holes 41–45, and the projections will begin to ramp the card forward because the pitch of these holes is greater than the pitch of the projections by "Δx". This ramping forward of the leader card 38 continues until one of the projections 28 enters the middle-most hole 46, because its pitch "x" is the same as the pitch of the projections. At that point, the condition of FIG. 6 is achieved and the leader card can make a smooth transition to the next processing rack.

The invention has been described with reference to a preferred embodiment. However, it will be appreciated that the variations and modifications can be effected within the ordinary skill in the art without departing from the scope of the invention.

I claim:

1. An improved film leader card of the type wherein said card has a series of holes adapted to receive respective projections on a timing belt within a film processor to transport a filmstrip attached to the card in the processor, each of the projections having the same pitch, and wherein the improvement comprises:

a forward group of the holes in said series being located closer to a leading area on said card than a trailing area on the card, and each of those holes having an identical pitch which is slightly greater than the pitch of the projections;

a rearward group of the holes in said series being located closer to the trailing area on said card than the leading area on the card, and each of those holes having an identical pitch which is slightly less than the pitch of the projections; and at least one of the holes in said series being located between said forward and rearward groups of holes, and having a pitch relative to an adjacent hole in the series which is the same as the pitch of the projections.

2. The improvement as recited in claim 1, wherein said adjacent hole is one of said rearward group of holes.

3. The improvement as recited in claim 1, wherein said hole that has the same pitch as the pitch of the projections is located intermediate said forward and rearward groups of holes.

4. The improvement as recited in claim 3, wherein the number of holes in said forward and rearward groups of holes is the same.

5. An improved film leader card of the type wherein said card has a longitudinal series of of similar size holes adapted to receive respective projections on a timing belt within a film processor to transport a filmstrip attached to the card in the processor, each of the projections having the same pitch, and wherein the improvement comprises:

said series totaling an odd number of holes;

only a middle-most hole in said series having a pitch relative to an adjacent hole in the series which is the same as the pitch of the projections;

one group of the holes in said series being located forward of said middle-most hole, and each of those holes having an identical pitch which is slightly greater than the pitch of the projections; and another group of the holes in said series being located rearward of said middle-most hole, and each of those holes having an identical pitch which is slightly less than the pitch of the projections.

6. An improved combination of a film leader card and a film processor of the type wherein said card has a series of holes adapted to receive respective projections on a timing belt within said processor to transport a filmstrip attached to the card in the processor, each of said projections having the same pitch, and wherein the improvement comprises:

a forward group of the holes in said series being located closer to a leading area on said card than a trailing area on the card, and each of those holes having an identical pitch which is slightly greater than the pitch of said projections;

a rearward group of the holes in said series being located closer to the trailing area on said card than the leading area on the card, and each of those holes having an identical pitch which is slightly less than the pitch of said projections; and at least one of the holes in said series being located between said forward and rearward groups of holes, and having a pitch relative to an adjacent hole in the series which is the same as the pitch of said projections.

7. An improved combination of a film leader card and a film processor of the type wherein said card has a longitudinal series of similar size holes adapted to receive respective projections on a timing belt within said processor to transport a filmstrip attached to the card in the processor, each of said projections having the same pitch, and wherein the improvement comprises:

said series totaling an odd number of holes;

only a middle-most hole in said series having a pitch relative to an adjacent hole in the series which is the same as the pitch of said projections;

one group of the holes in said series being located forward of said middle-most hole, and each of those holes having an identical pitch which is slightly greater than the pitch of said projections; and another group of the holes in said series being located rearward of said middle-most hole, and each of those holes having an identical pitch which is slightly less than the pitch of said projections.

* * * * *